(12) United States Patent
Shann et al.

(10) Patent No.: US 7,127,711 B2
(45) Date of Patent: Oct. 24, 2006

(54) FORMING AN EXECUTABLE PROGRAM

(75) Inventors: Richard Shann, Newport Gwent (GB); Stephen Clarke, Sunnyvale, CA (US); Benedict Gaster, Bristol (GB); Con Bradley, Bristol (GB)

(73) Assignee: STMicroelectronics Limited, Bristol (GB)

( * ) Notice: Subject to any disclaimer, the term of this patent is extended or adjusted under 35 U.S.C. 154(b) by 847 days.

(21) Appl. No.: 09/872,475

(22) Filed: Jun. 1, 2001

(65) Prior Publication Data
US 2002/0104078 A1 Aug. 1, 2002

(30) Foreign Application Priority Data
Jun. 1, 2000 (GB) ................. 0013336.3

(51) Int. Cl.
G06F 9/44 (2006.01)
(52) U.S. Cl. .................................... 717/162
(58) Field of Classification Search ........ 717/162–167, 717/154, 151, 140; 707/2
See application file for complete search history.

(56) References Cited

U.S. PATENT DOCUMENTS 5,511,207 A * 4/1996 Ohde et al. ................ 712/241
5,802,265 A * 9/1998 Bressoud et al. ............. 714/11
5,819,256 A * 10/1998 Ozbutun et al. ............... 707/2
5,966,539 A * 10/1999 Srivastava .................. 717/156
6,314,564 B1 * 11/2001 Charles et al. .............. 717/162
6,457,171 B1 * 9/2002 Mann et al. ................ 717/138

OTHER PUBLICATIONS

Chamberlain et al., "Using Id The GNU linker Id version 2 version 2.9.4", pp. 1-73, Mar. 1999.*
Chamberlain, S., *Using LD, The GNU Linker*, version 2, Free Software Foundation, 1994, pp. 1-62.

* cited by examiner

*Primary Examiner*—Tuan Dam
*Assistant Examiner*—Eric B. Kiss
(74) *Attorney, Agent, or Firm*—Lisa K. Jorgenson; Dennis M. de Guzman; Seed IP Law Group PLLC

(57) ABSTRACT

A linker is described and the method of forming an executable program from object code modules using the linker. The linker uses a linker control language in the form of an ordered sequence of relaxation instructions. The relaxation instructions include a jump relaxation instruction which specifies the instruction count of the relaxation instruction which is subsequently read. In this way, more flexibility can be provided for linkers.

22 Claims, 7 Drawing Sheets

FORMING AN EXECUTABLE PROGRAM

FIELD OF THE INVENTION

This invention relates to forming an executable program using a linker.

BACKGROUND TO THE INVENTION

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations which are used to combine the object code modules at link time in a linker.

The ELF (executable linking format) standard defines a convention for naming relocation sections belonging to a given section, e.g., rela.abc is relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32-bit ELF standard allows only 256 distinct relocation types, so the same types are reascribed to different semantics for each instruction set.

The existing linkers each have to be set up to understand the particular semantics used for the type definitions in the relocations for each instruction set. Moreover, the relocation operations which can be defined by the relocations are limited in the existing ELF standard.

SUMMARY OF THE INVENTION

According to a first aspect of the present invention there is provided a method of forming an executable program from a plurality of object code modules, each object code module comprising section data and an ordered sequence of relaxation instructions including a first type defining relocation operations and a second type controlling linker operations, wherein the second type includes a jump relaxation instruction which specifies the instruction count of the relaxation instruction to be subsequently read, each relaxation instruction having a unique instruction count associated therewith, the method comprising:

(a) reading each relaxation instruction in the ordered sequence defined by the instruction count, and (b) where said relaxation instruction is of the first type defining a relaxation operation, executing that relocation operation on section data to which it relates, and where said relaxation instruction is a jump relaxation instruction, the next relaxation instruction which is read is that of the instruction count specified in the jump relaxation instruction.

A further aspect of the invention provides a linker for preparing an executable program from a plurality of object code modules, each object code module comprising section data and an ordered sequence of relaxation instructions including a first type defining relocation operations and a second type controlling linker operations, each relaxation instruction having a unique instruction count associated therewith, the linker comprising: a relaxation module for reading the relaxation instructions in an ordered sequence defined by the instruction count, and executing said relaxation instruction; a section data module for holding section data; wherein, when said relaxation instruction defines a relocation operation, the relaxation module executes said relocation operation on section data defined in one or more previous relaxation instructions and, when said relaxation instruction identifies section data, said section data is copied to said executable program, said section data being relocatable by subsequent relocation operations.

The invention also provides a computer program product capable, when run on a computer, of implementing the above-defined method.

According to an additional aspect of the present invention there is provided a method of forming an executable program from a plurality of object code modules, each object code module comprising section data and an ordered sequence of relaxation instructions including a first type defining relocation operations and a second type controlling linker operations wherein the second type includes a conditional relaxation instruction which determines whether subsequent relaxation instructions are executed depending on a condition defined in the condition relaxation instruction, the method comprising:

(a) reading each relaxation instruction in the ordered sequence defined by the instruction count, and (b) where said relaxation instruction is of the first type defining a relaxation operation, executing that relocation operation on section data to which it relates, and where said relaxation instruction is a jump relaxation instruction, the next relaxation instruction which is read is that of the instruction count specified in the jump relaxation instruction and where the relaxation instruction is a conditional relaxation instruction, accessing a state variable which denotes linker state to determine whether or not the condition is satisfied.

According to yet a further aspect of the present invention there is provided a method of forming an executable program from a plurality of object code modules, each object code module comprising an ordered sequence of relaxation instructions including a first type defining section data, a second type defining relocation operations and a third type controlling linker operations, each relaxation instruction having a unique instruction count associated therewith, the method comprising: reading each relaxation instruction in the ordered sequence defined by the instruction count; where said relaxation instruction defines a relocation operation executing said relocation operation on section data defined in one or more previously read relaxation instructions; where said relaxation instruction defines section data, copying said section data to said executable program, said section data being relocatable by subsequent relocation operations.

The ordered sequence of relaxation instructions referred to herein employs a linker control language (LCL). Important components of the linker control language comprise:

a conditional instruction that defines the number of subsequent relaxation instructions to be skipped in dependence on a condition being met;

a jump instruction that specifies the number of a particular relaxation instruction which is to be next executed by the linker; and a write instruction that specifies information to be written to the executable program by the linker.

According to the present invention there is also provided a method of forming an executable program from a plurality of object code modules by operating a linker in accordance with a linker control language, said language comprising an ordered sequence of instructions, each instruction have a unique instruction count associated therewith, said ordered sequence of instruction including a conditional instruction, a jump instruction and a write instruction, said method comprising:

reading each instruction in the ordered sequence defined by the instruction count:

when said instruction is a conditional instruction executing said instruction by disregarding a number of instructions defined by the conditional instruction in response to a condition being met, the condition being defined by the conditional instructions;

when said instruction is a jump instruction executing said instruction by subsequently executing a particular instruction, the instruction count of which is specified by the jump instruction;

when said instruction is a write instruction executing said write instruction by writing specified information to the executable program by the linker, the information being specified by the write instruction;

storing the number of times the linker has executed said ordered sequence of instructions in a first variable; and storing in a second variable a value indicative of whether or not the executable program formed by said linker in accordance with the most recent execution of said ordered sequence of instructions has changed from the executable program previously formed by the linker in accordance with the previous execution of said ordered sequence of instructions.

The linker preferably holds a state variable as a pass variable which indicates the number of times a set of ordered instructions has been executed by the linker. The linker can preferably also hold a second state variable in the form of a change variable which flags whether or not section data has changed during the last pass of execution of the relaxation instructions.

For a better understanding of the present invention and to show how the same may be carried into effect, reference will now be made by way of example to the accompanying drawings.

DESCRIPTION OF THE PREFERRED EMBODIMENT

Figure 1:
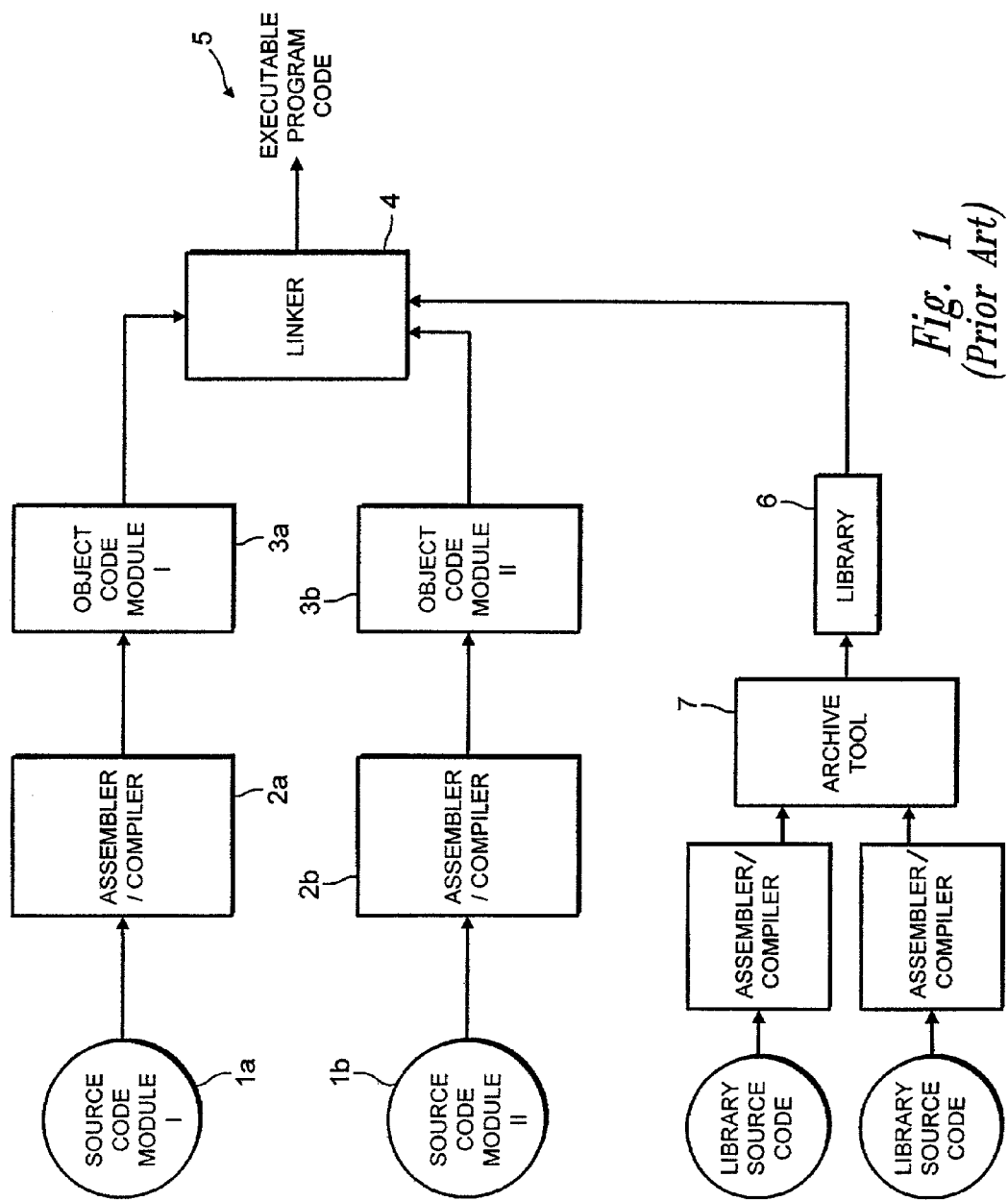
FIG. 1 is a block diagram illustrating the context of the invention.

With reference to FIG. 1, a system for linking a number of program modules to form a single executable program is shown schematically. A number of program source code modules $1a,1b$, each module written in a high level language is provided. The particular high level language used for each source code module may vary from module to module, or alternatively all of the program source code modules may be written in the same high level language. Each source code module $1a,1b$, is input to a respective assembler/compiler $2a,2b$ which assembles and/or compiles the high level language of the source code module to produce an object code module $3a,3b$. Each object code module $3a,3b$ is the low level language equivalent to each respective source code module $1a,1b$, the low level language being a language which is directly executable by a target microprocessor into which the final resulting single executable program is to be loaded. It will be appreciated that a single assembler/compiler could be used to sequentially convert a number of source code modules to respective object code modules.

Each object code module $3a,3b$ is passed to a linker 4. Object code modules may be stored in libraries, such as the library 6 in FIG. 1, placed under the control of an archive tool 7. The linker combines all of the respective object code modules $3a,3b$ to produced single executable programs, still in the low level language suitable for the target processor into which the program is to be loaded, although it will be appreciated that some parts of the object code modules will need to be subject to relocations before forming part of the final executable program.

For a given architecture there are often different instruction sequences for achieving the same objective depending on the values of the operands which are being handled. For example, "load a function address into a register" may be achieved in various ways depending on the address in question. When the operand is unknown before link time there is scope for re-writing the code at link time depending on the value of the operand. This re-writing of the code is a form of optimization termed herein "linker relaxation."

In United Kingdom Patent Application No. 9920905.8 in the name of STMicroelectronics Limited, the present assignee, a scheme is described for achieving linker relaxation based on information written in assembler files and passed to the linker as special relocations. The special relocations are also used for rewriting particular instruction sequences as one of a set of known alternatives.

Each execution of an assembler generates an object code module including sets of section data, each set of section data having a set of relocations generated by the assembler to describe how the section data is to be patched so as to render it compatible with other section data to form the program 5. These relocations are generated by the assembler. Section data comprises a plurality of code sequences executable in the final program, and data values to be accessed by the executing program.

In particular a set of "relocations" to enable link time optimization of code is described. Conventionally a relocation describes the patching of section data or instructions with (encoded versions of) symbols. Such relocations are referred to herein as "bit relocations". In addition a number of so-called "special relocations" are discussed in GB 9920905.8 which are sometimes referred to in the following as "non-bit" relocations to distinguish from conventional "bit" relocations.

In particular, in GB 9920905.8 a "macro-call" relocation is defined that allows section data (code sequences) to be inserted from a special section (".macro" section) written to contain frequently used idioms. Section data that is to be selectively inserted into a section being optimized by the linker can be thought of as a "link time macro." It is parameterized by symbols with the substitution of the values for the parameters being performed by the linker.

One use of the macro-call relocation is to conditionally introduce selected instruction sequences from a number of alternatives into the executable program. The alternative instruction sequences are written as alternative sequences in the special macro section in the object code modules and a macro call is inserted at the point in the ordinary section wherein one or more of them may be needed. As mentioned above, the object code modules can be user defined or retrieved by the linker 4 from a library 6 as object files containing template code for insertion in the executable program wherever it is needed.

For the sake of completeness there follows the bit relocations and non-bit relocations which are discussed in the earlier application previously referred to and which have application in the Linker Control Language discussed herein.

Note that the following notation is used to name the bit relocations:

R_b<val>s<val>B<val> where <val>'s represent the number of bits, start bit and number of bytes as specified by fields of the relocation referred to as r.bits, r.bitstart, r.bytes field, where the r.bit field, represented by a lower case "b", is the number of bits that are to be patched, the r.bitstart field, represented by a lower case "s", is the least significant bit to be patched, and the r.bytes field, represented by an upper case "B", is the size of the object being patched. This is needed for big endian targets in order to find in which byte the least significant bit is to be found, and where the high order bits are.

For example R_b16s0b4 will patch the least significant two bytes of a four byte object. This will be bytes at offsets 0,1 or 4,3 depending on the target endianness.

Link Time Stack Relocations

These special relocation types allow the linker to support a general purpose stack based calculator. These relocations allow the value of symbols and constants to be pushed on the stack and a designated manipulation to be performed. Binary operations may act on the top two stack entries, or alternatively, the value passed and the top of stack (tos) entry are used. Unary operations operate on the top of the stack (tos). Both pop their operands and place the result on the top of the stack. The full definition of the relocation types to support this is given in GB 9920905.8. There follows an example of their use:

Patch Symbol Plus Addend in 16 Bit Target Integer.

Figure 4:
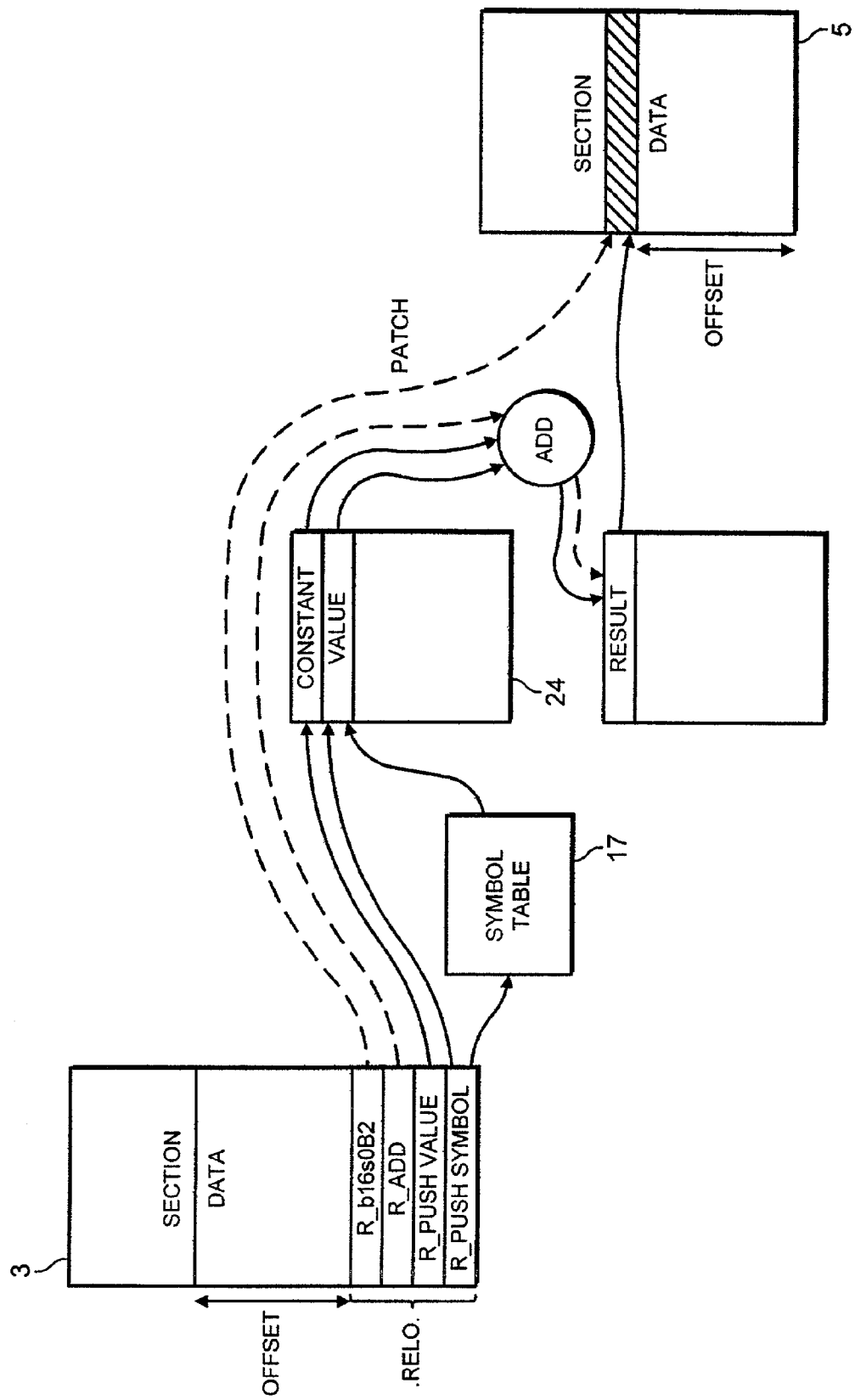
FIG. 4 is a schematic diagram illustrating an example of the use of special relocations to implement calculations.

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom in FIG. 4. The listed relocations are:

R_PUSH symbol (relocation to push value of symbol on stack)

R_PUSH value (relocation to push constant value on stack)

R_ADD (pop top two values off stack, add them, and push result back)

R_b16s0B2 (patch the value popped from the top of stack into the section data, 16 bits are to be patched, starting at bit 0, in target object two byte wide) all with the same offset (the offset of the instruction or data to be patched in the section).

The above relocations are implemented as described in the following with reference to FIG. 3 and 4. The section data and relocations are read by the module reader 10. The section data is applied to the section data module 14 and the relocations are applied to the relocation module 12. The relocation module considers the first relocation, in this case R_PUSH symbol and acts accordingly to read the required value of the identified symbol from the symbol table 17 and push it onto the stack 24. The subsequent relocations are read, and the necessary action taken with respect to the stack as defined above. Finally, the last bit relocation R_b16s0B2 patches the final result value from the stack 24 into the 16 bit target integer. This patched section data is held in a section data module 14 ready for inclusion in the final program at the program former 20 unless, of course, some later relocations make further modifications prior to completion of linking.

Conditional Relocations

Another set of the non-bit relocations allow code sequences to be conditionally included in a final executable program where all the possible alternative sequences are included in the section data of the object code module which the linker is currently examining. The code sequences which it is determined are not required are deleted at link time. The following are the non-bit relocations used to support conditional section data deletions, which are issued by the assembler responsive to special conditional Assembler Directives.

R-IF

Causes the top entry to be popped from the linker's stack of values. If the value is zero then section data is skipped and the succeeding relations are ignored until R_ELSE/R_ENDIF is encountered. If the value is non-zero then relocations are processed and instructions are not deleted until R_ELSE/R_ENDIF is encountered.

R-ENDIF

Defines the end of the relocations subject to the R_IF relocations, and of section data to be conditionally deleted subject to the R_IF relocation.

R-ELSE

If this is encountered while section data is being taken then section data is skipped and the succeeding relocations are ignored until R_ENDIF is encountered. If encountered while skipped due to R_IF then relocations are processed and instructions are no longer deleted until R_ENDIF is encountered.

R-STORE index

A value is popped from the linker's stack of values. It is put in a conditional array in the linker kept by the linker for this purpose. The value is stored at the index passed with the relocation. This relocation avoids the overhead of passing the same calculation to the linker many times over.

R-FETCH index

A value is pushed on the linker's stack of values. The value pushed is the value in the condition array at the index passed with the relocation.

A further set of non-bit relocations is defined for implementing macros.

R-START-MACRO

The linker seeks this relocation at the offset labeled by the macro name (relocations prior to this one are not processed). It is an error if the linker encounters this instruction except on entry to a macro.

R-GET-PARAM index

The relocation conveys an index for accessing a parameter array in the linker. The linker reads the index'th parameter from the parameter array. If the parameter is an index in the symbol table of the linker, the symbol's value is pushed on to the linker's stack of values. Otherwise the value itself is pushed.

R-EXIT-MACRO

The linker stops inserting bytes/processing relocations from the macro section. It discards the parameter array and then the macro invocation terminates.

Further non-bit relocations for Ordinary Sections include:

R-PUT-PARAM index

An index is passed to the linker and the value is stored by the linker in the parameter array at this index. The linker also stores the value of this relocation along with the parameter. This enables the linker to perform type checking when R_GET_PARAM is encountered.

R-MACRO-CALL symbol

The symbol specifies an offset in the macro section. The relocations in .relo.macro are traversed from the R-START-MACRO at that offset until R-EXIT-MACRO is processed. Section data from the macro section are inserted in the section at the location of the R-MACRO-CALL relocation.

In the context of the following, relocations are referred to as relaxation instructions or RIs, for reasons which will become clear.

The described embodiment of the present invention introduces new approaches to link time optimization. One of these is based on the provision of an object code module as a single ordered sequence of relaxation instructions, rather than being divided into section data and relocations. Another involves the introduction of additional RIs with new semantics as discussed below. In particular, a "jump" type instruction R_GOTO is included which allows a subsequent relaxation instruction to be executed "out of sequence," as described in more detail later. Moreover, the RIs can reference state variables held by the linker. That is, there is a conditional relaxation instruction discussed in the following, R_IF, which conditionally determines whether or not subsequent relaxation instructions are to be executed or skipped. It does this based on the tos (top of stack) value which can, in the described embodiment, be determined from the value of state variables held by the linker. For example, the R_IF relaxation instruction referenced to the pass number of the linker could be used to allow a user to terminate the link if the pass number reached 100. The combined effect is to allow RIs to construct a unified linker control language (LCL) which can be executed by the linker at link time.

The new RIs which have been introduced are:

R-BYTE <N>

In this instruction, each byte of the section data is represented by a value N passed by one R_BYTE instruction. N can have a value 0–255 to represent one byte of section data. With the R_BYTE instruction in this format, object modules do not contain separate section data, the section data being carried by the R_BYTE instructions.

Alternatively, a further new relaxation instruction R_BYTES may be used instead of R_BYTE. The syntax of an R_BYTES instruction can be represented as R_BYTES numbytes, offset. This instruction directs the linker to copy the number of bytes of section data given by numbytes to the target executable, starting at the specified offset.

R-IF[X]

This RI specifies a following group of X RIs which are to be alternatively executed or skipped by the linker. When an R-IF[X] instruction is executed, the top value from the linker stack (see later) is read to determine if it is set at True or False (where any non-zero value denotes True). The format of the relocation is R-IF[X], where X is the number of following relaxation instructions which are to be conditionally executed (if True) or skipped (if False) by the linker. Because of the R_BYTE (or R_BYTES) relaxation instruction, the R_IF [X] can specify exactly which bytes to include in the final executable.

For the LCL of the present invention, the R-IF[X] RI can be used in place of the non-bit relocation R-IF described above. Although the overall effect of the R-IF[X] RI is the same as for the corresponding R-IF non-bit relocation, by specifying the number X of RIs to be alternatively skipped or executed there is no need for an RI corresponding to the previous non-bit relocation R-ENDIF.

R-GOTO

This RI specifies the location in the ordered sequence relaxation instructions which should be executed next, with the linker operation continuing from that point. As discussed in the following, a unified instruction count is used to determine the ordered sequence. Then, for example, R-GOTO[1032] instructs the linker to jump to the RI with the unified instruction count of 1032. That RI will be executed, followed by RI 1033.

R-ORG

This is a novel relaxation instruction that sets the target program count (TPC) to the address passed by the R_ORG instruction. This relaxation instruction can be written by a user in the LCL sequence or generated by a linker responsive to an appropriate directive in the linker command line.

The relaxation instruction R_ORG distinguishes over earlier linkers which set the TPC at the start of each section being relocated in response to directives written on invocation of the linker. R_ORG can be used to provide a single ordered sequence for the entire program.

Relaxation instructions R-IF and R-GOTO can be used to provide an iterative function within the LCL. By placing an R-GOTO instruction at the end of a group of instructions which follows an R-IF instruction, with the R-GOTO instruction identifying the instruction count of the R-IF instruction, the group of instructions between the R-IF and R-GOTO instruction will be repeated until the stack value read by the R-IF instruction changes from True to False.

A simple example of this is given below which emits a series of bytes 0×0 until the program counter is four byte aligned.

| RI | Instruction Count |
|---|---|
| R_IF<5> | 01 |
| R_PC | 02 |

-continued

| RI | Instruction Count |
|---|---|
| R_PUSH 3 | 03 |
| R_AND | 04 |
| R_BYTE <0x0> | 05 |
| R_GOTO <01> | 06 |

Instructions 01 to 06 are repeatedly executed until the value on the top of the stack is zero. R_PC pushes the target program counter onto the stack. This happens when the target program counter, which is incremented by 1 on each R_BYTE, has its bottom two bits clear (this is tested by the bitwise AND with the value 3,00000011 in binary). In this case the R_IF instruction causes the program to skip 5 Instructions.

The state variables held by the linker to allow the LCL to control such things as program termination are.

i) Pass Number (LS-PASS): This is the number of times the main section of the LCL sequence has run, i.e., the number of passes the linker has made of the LCL sequence. It is incremented by 1 by the linker at each pass.

ii) Changed Flag (LS-CHANGE): This is set FALSE by the linker at the start of each pass and becomes TRUE if a symbol which refers to a set of section data changes its value. This indicates that the target executable program has changed.

iii) TPC: The sum of the number of R-BYTE instructions (or the number of bytes emitted by an R_BYTES instruction) executed since the last R_ORG instruction was executed and the address passed by that R_ORG.

Whenever section data is included or excluded by a relocation instruction the value of symbols labeling section data later in the pass may require to be changed. This is achieved by using a further new RI R_UPDATE_SYMBOL which is present at the location of each such symbol. This RI specifies that the symbol is to be updated, which is done by storing the TPC as its value.

Figure 2:
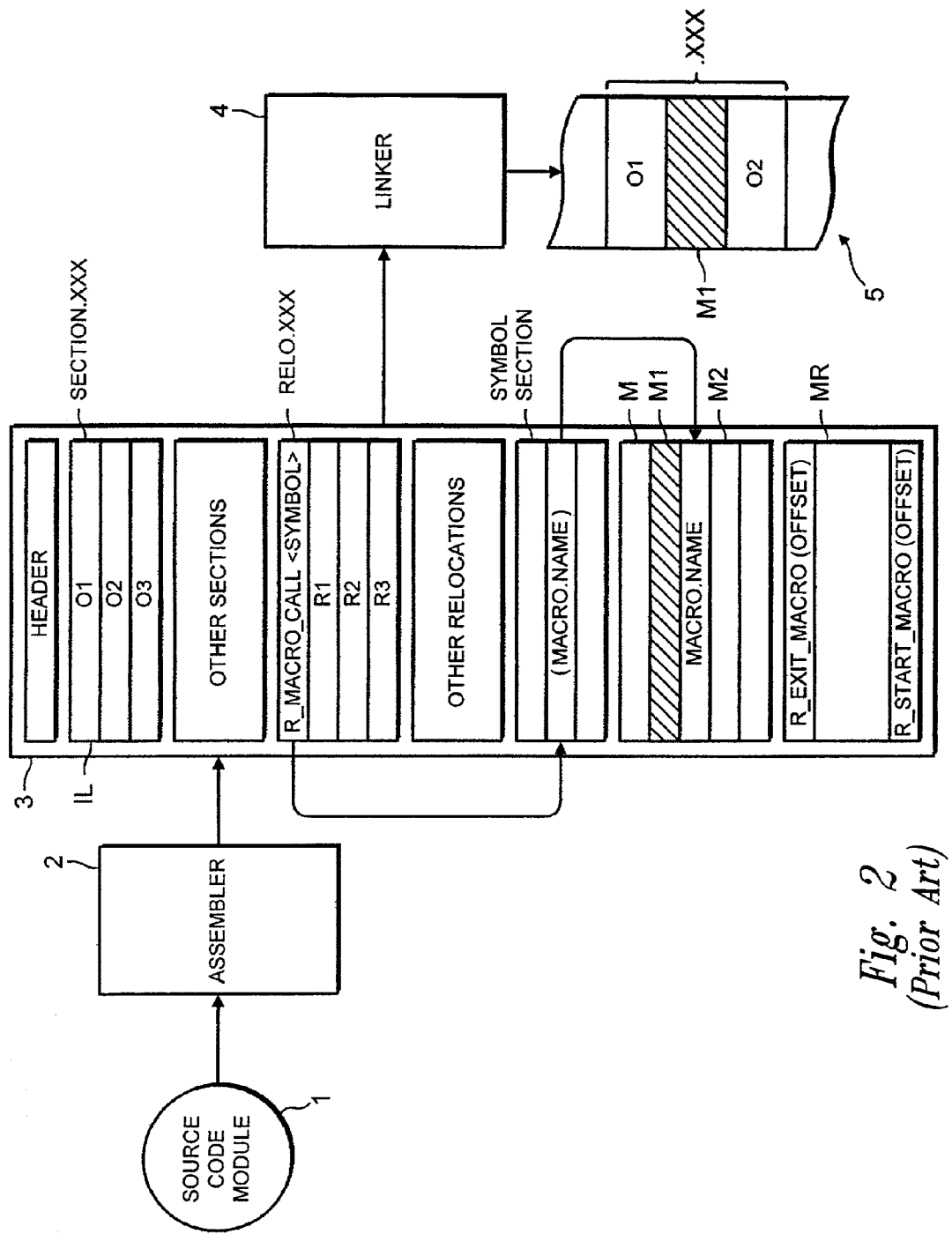
FIG. 2 is a schematic diagram showing the structure of an object module according to the prior art.

As described previously with reference to FIG. 1, existing linkers take as an input a plurality of object code modules each having a structure of section data, relocation data, a symbol table and possible link time macros as shown in FIG. 2. These object code modules are referred to herein as Linker input modules. The linker merges them by simple concatenation of the respective section data and macro section data and by merging the relocation data, symbol tables and macro relocation sections to form a single linker output module. The merging of symbol tables and relocation sections is a well known process.

In the described embodiments of the present invention a unified Linker Control Language (LCL) is used to form the individual object code modules. That is R_BYTE (or R_BYTES) are used to represent section data within the stream of relaxation instructions.

It is possible to achieve the advantage of LCL without a unified stream of relaxation instructions, that is still retaining relocations separately from section data. Our earlier UK Application No. 9928340.0 explains how a linker operates using existing relocations with separate section data. According to aspects of this invention R_GOTO and the ability to reference state variables provide important advantages.

The Linker takes each input LCL object code module and merges them to form an output LCL program. The main function of the output LCL program is executed by the linker until a predefined instruction is encountered. Execution of the output LCL program comprises either copying specified bytes to the target executable (responsive to R_BYTE or R_BYTES RIs) or performing other types of operations responsive to other relaxation instructions.

Figure 5:
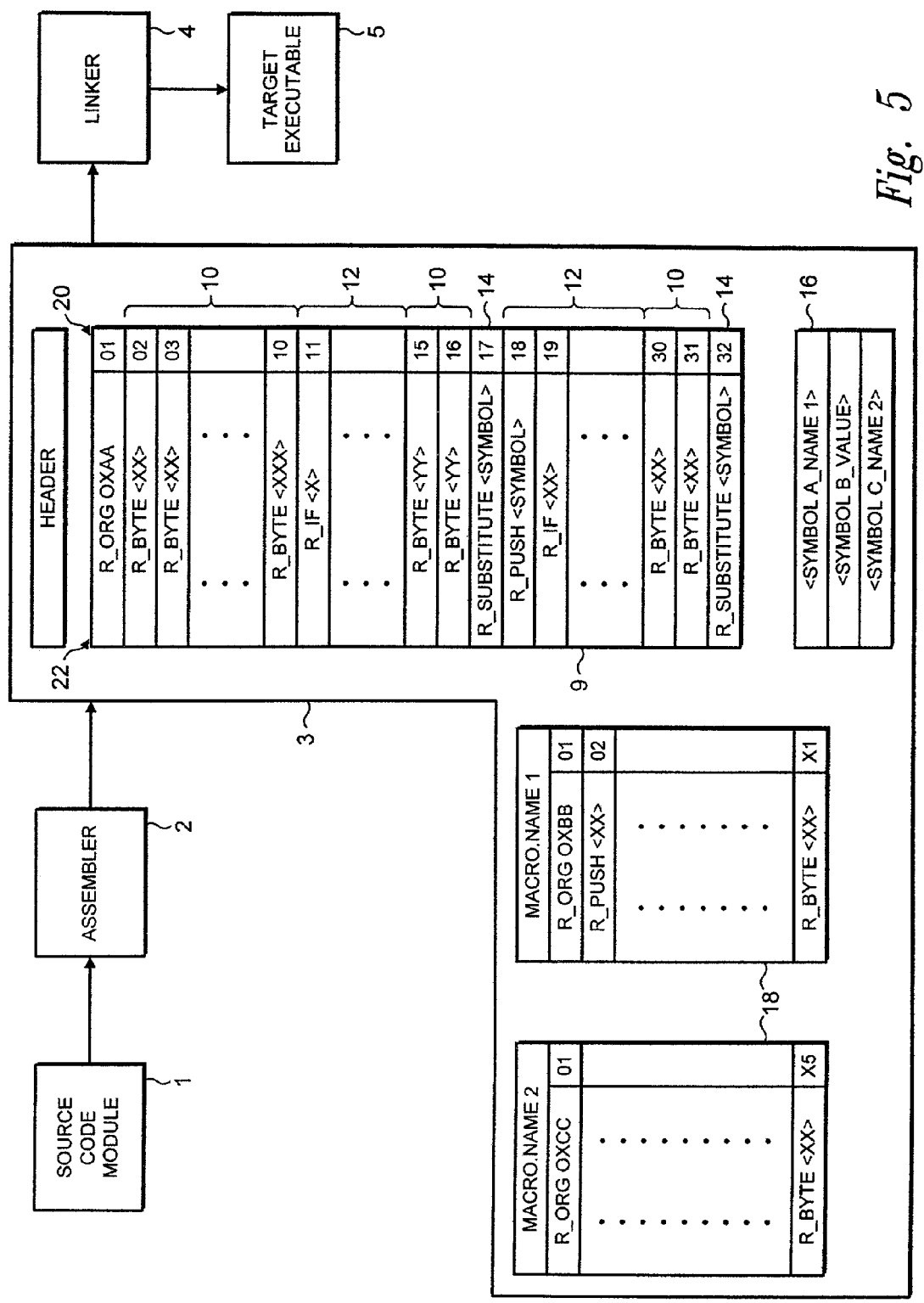
FIG. 5 is a schematic diagram of the structure of an LCL program according to an embodiment of the present invention.

The overall structure of one of the individual input LCL object code modules is shown in FIG. 5. The main function 9 of the LCL program comprises a number of RIs 22, each with an associated Unified Instruction Count 20. The first RI in the LCL can be written as R_ORG. Alternatively, R_ORG can be generated from a directive, it has the instruction count 01. The following RIs within the main function of the LCL program have sequentially incremented instruction counts.

The RIs can be considered to fall into three categories; section data 10, patching data 12 and macro section invocations 14. Patching data RIs 12 are always preceded by a section data RI 10 corresponding to the section data on which the following patching RI is to act. That is, a set of section data bytes loaded by the linker, followed by a patching RI, describing a patching operation. The section data bytes are patched according to the patching data relaxation instructions.

The LCL further comprises a symbol table 16 and may include one or more macro function 18. The macro functions 18 define section data that is to be optionally inserted into the final Target Executable. They can include frequently used idioms or routines which vary depending on the environment in which the Target Executable is to be executed. At the point in the main LCL function 9 where the section data of a macro function 18 may be required a macro invocation RI 14 is placed. The macro invocation RI used in the LCL described herein is R-SUBSTITUTE <SYMBOL>, SYMBOL identifying the name of the macro function 18 by reference to the symbol table 16. Each macro function is identified by a MACRO.NAME which is pointed to in the symbol table 16 by an identified symbol. Each macro function 18 has the same structure as the main function 9 of the LCL.

Each RI of the LCL is executed by the linker 4 in order according to its instruction count to generate the output Target Executable 5.

Figure 6:
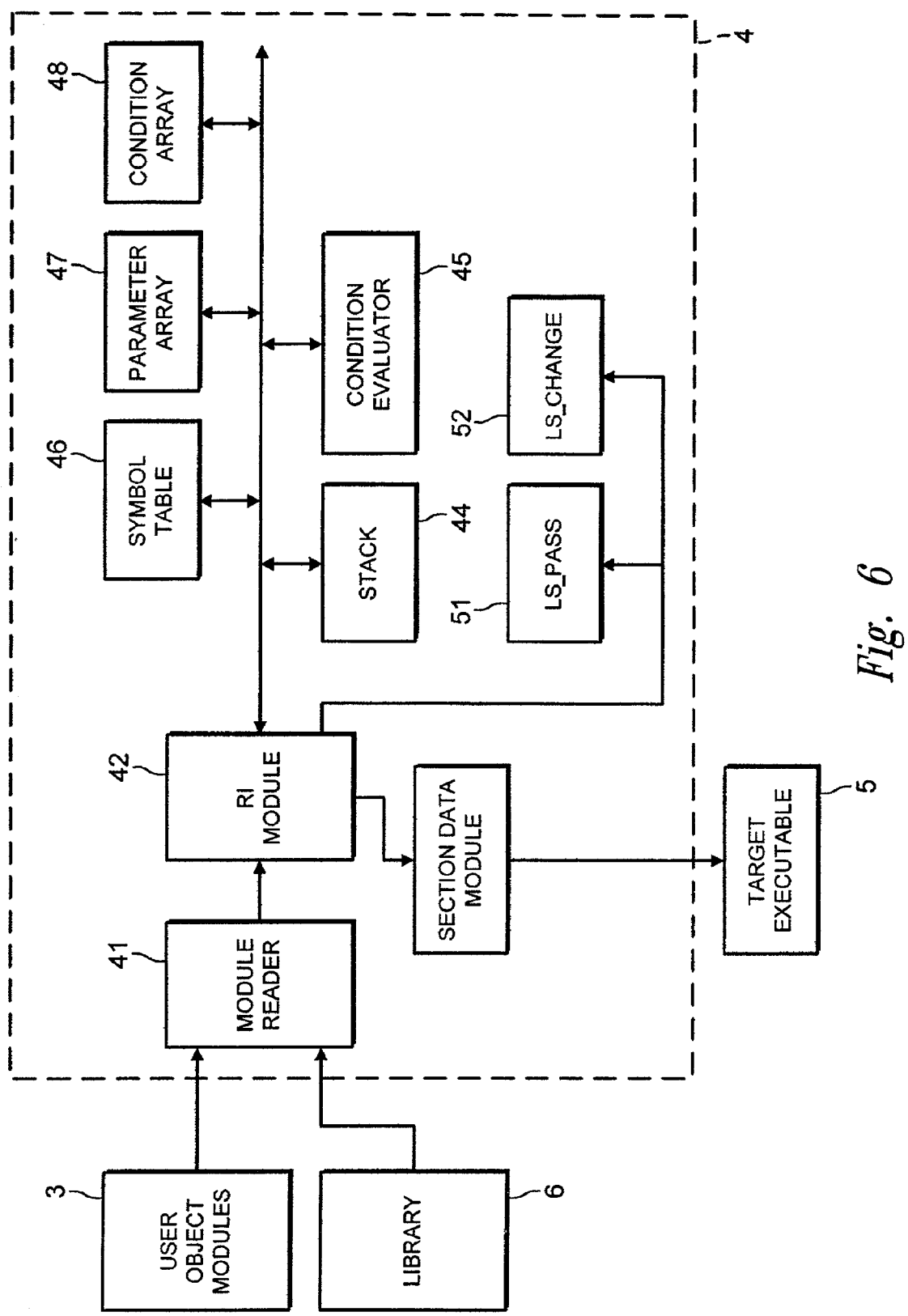
FIG. 6 is a block diagram of a linker for use with an LCL program according to an embodiment of the present invention.

FIG. 6 is a block diagram of components of the linker 4 which will be used in conjunction with the LCL program of the present invention. It will be appreciated that in practice the linker can be constituted by a suitably programmed microprocessor. It will be understood therefore that the schematic blocks shown in FIG. 6 are for the purposes of explaining the functionality of the linker.

The LCL object modules 3 and any library LCL programs 6 are loaded into a module reader 41. Each RI of the LCL is then read from the module reader 41 by an RI module 42 in the order of their instruction count. Section data defined by an executed R-BYTE instruction is copied directly by the RI module 42 to a section data module 43.

The RIs read by the RI module 42 which define relocation and patching instructions are executed by the RI module 42, utilizing the linker stack 44, symbol table 46, parameter array 47, condition array 48 and condition evaluator 45 as required by the specified relocations. The execution of the RIs by the RI module 42 will normally result in a patching operation occurring in section data which has already been read. This patched section data will be the next RI read by the RI module 42 and will thus be copied to the section data module 43 as previously described.

When all of the RIs in the LCL program have been executed by the linker, the patched and unpatched section data contained in the section data module 43 may be output from the linker and as the desired Target Executable program 5 by executing the R_EXIT relocation.

As is known in the art, the linker may execute the LCL a number of times before the output target executable is in the optimum form. As described, the state of certain variables are recorded during each pass. The variable LS-PASS and LS-CHANGE are updated by the linker 4 and are stored in the variable modules LS-PASS 51 and LS-CHANGE 52. These variables can be used as stack values responsive to the R_IF relaxation instruction to allow state variable based conditions to be determined.

These state variables may be pushed onto the top of the stack using the R_PUSH relocation referred to earlier.

Figure 7:
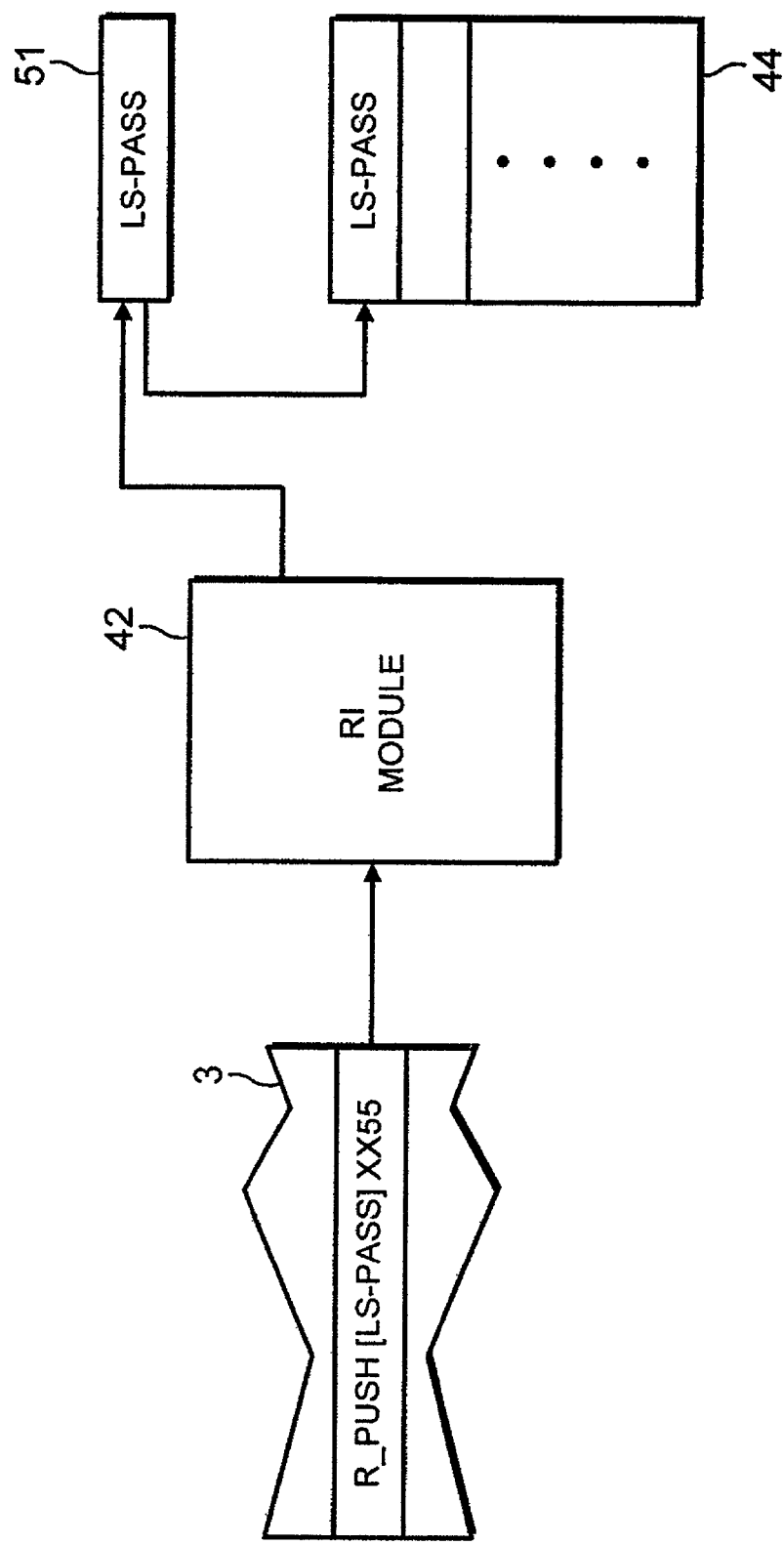
FIG. 7 is a schematic diagram showing an example of the use of a state variable according to an embodiment of the present invention.

The state variable can be pushed onto the stack to be tested to determine if the Target Executable program 5 should be output from the linker and the link process concluded. An example of this is shown in FIG. 7 which illustrates the sequence of operations for testing the value of the state variable LS_PASS to determine if a predefined maximum number of linker passes have been executed, and if so terminating the link process by executing an R_EXIT instruction. The sequence of RI's are as follows:

| RI | VIC |
|---|---|
| R_PUSH [LS_PASS] | 0094 |
| R_PUSH [VALUE] | 0095 |
| R_EQ | 0096 |
| R_IF [I] | 0097 |
| R_EXIT | 0098 |
| R_GOTO [0001] | 0099 |

The sequence of RI'S occur at the very end of the order sequence of RI's in the object code module 3. R_PUSH [LS_PASS] RI operates to push the value of the state variable LS_PASS from the variable module LS_PASS 51 onto the stack 44, followed by the R_PUSH [VALUE] RI, where VALUE is a constant value set at the maximum permitted number of linker passes. LS_PASS and VALUE are tested to se if they are equal. This performed by the RI R_EQ which returns either True or False result to the top of the stack, depending on whether or not the top two values of the stack 44 are equal or not. R_EQ is a further non-bit relocation which is discussed in the earlier application previously referred to.

The result returned to the top of the stack 44 is then read by the R_IF RI, as previously discussed, so that only when the result is True is the RI R_EXIT executed to terminate the link process, otherwise the RI R_Goto is executed which returns to the very first instruction in the object code module 3.

These state variables may be pushed onto the top of the stack using the R_PUSH relocation referred to earlier, as illustrated in FIG. 7. The RI module 42 reads the R_PUSH [LS PASS] RI from the LCL 3 and reads the value of the state variable LS_PASS from the variable module 51 and subsequently pushes the value of the LS_PASS onto the stack 44. The subsequent relocations are read and the necessary action taken with respect to the stack in an analogous manner to that previously defined with respect to FIG. 4.

From the foregoing it will be appreciated that, although specific embodiments of the invention have been described herein for purposes of illustration, various modifications may be made without deviating from the spirit and scope of the invention. Accordingly, the invention is not limited except as by the appended claims.

Annex 1 is an extract from a paper prepared by the present inventors describing the LCL described in this application and is incorporated herein.

ANNEX 1

2. LCL OVERVIEW

A linker takes as its input a collection of object modules, a collection of libraries of object modules and a set of directives describing the desired memory layout of the code and data. There are four basic actions that the linker then performs.

- Concatenation: Some of the information in the input modules is concatenated. For example, executable code sections of the same name may be bunched together to form larger sections; the order may be prescribed by directives to the linker. Padding may be required between contributions from different modules to preserve alignments prescribed in the modules.

- Symbol Merge: Each module has a symbol table containing local and global symbols. The global symbols will either be definitions or references—merging is the process of linking references to (unique) definitions.

- Relocation Section Merge: The relocation sections describe how to patch up the executable image at points where it depends of the values of symbols. These symbols have been merged in the previous step, and so the relocation sections must refer to the new symbol table.

- Relocation: The symbol values are patched in—this may involve encoding the value (*e.g.*, scaling by 2 or subtracting the program counter).

At this stage a glance at the code may reveal many infelicities due to the fact that the code was generated in separate pieces. For example, constant loading may use instructions capable of handling much larger constants than needed, simply because until the final link the value was unknown. It may be apparent that a shorter instruction sequence could have been used, or that some item of data is not referenced. This will happen where a module was written pessimistically because it involved an external symbol, whose value has now been resolved. The process of eliminating such awkwardness is called linker relaxation.

It is possible to perform relaxation by interpreting the object modules and making certain assumptions about the way the code has been written. For example, that there is no data embedded in the executable code, or that switch statements are encoded using jump tables etc.

This approach makes the linker optimiser quite architecture specific, and involves contracts between the linker and the compiler about how the code reflects the intentions of the source code authors. This is less attractive in the environments where the architecture may be under development or the turn-around of new architectures is high. In this case we want the knowledge of the architecture kept together where it is required—in the compiler back end—and to let the compiler writers design and code the link time optimisations. This is the approach taken in this paper. We propose a language to be used by the compiler to select/modify/re-order code and data at !

link time, and, more ambitiously, to (programmatically) search for an optimal executable.

Typically, the object modules will contain "worst case" code sequences and annotations by the compiler indicating alternatives and the conditions under which they should be used. A dumb linker will ignore the annotations, while a smart linker will evaluate the conditions and substitute the improved sequences. In general, altering the data in this way is an iterative process, since symbol values (some forward references) and alignment padding will change.

When the size of the target executable is relatively small compared with the capacity of the host environment being used to perform the linking, then it becomes quite feasible to accept the overhead of extra information stored in object files to assist the linker. This is often true for embedded systems, for which the scheme presented here was developed.

As described in the introduction the aim of this paper is to describe a prototype a general purpose language for linking, i.e., LCL, using Haskell. An LCL program comprises a main function that contains instructions to execute LCL procedures defined in the input object modules. A procedure contains instructions that identify which section data is to be included in the output executable, and determine the value of symbols that label locations in the input data, as well as, of course, actually relocating the data. Because references to symbol values may be forward references, the main function will normally contain a loop repeating the link process until a self-consistent image is achieved or the link abandoned.

The language generalises the arithmetic operations performed to relocate code and adds conditional inclusion of section data and a specialised form of macro call. The macro call is syntactically the same as a procedure call, being distinguished by its use. A macro contains code or data that will be included multiple times in the final executable, for example the code for making a branch. A procedure, on the other hand, is intended to be included only once in an executable. In consequence, global symbols can only be defined in procedures, not macros.

3. A STATIC SEMANTICS FOR LCL

The implementation assumes some basic type synonyms including Name, Value, Index, SName, SymValue, Byte, Offset, and Section. Some standard properties for these type are assumed, printing and testing for equality, for example. Furthermore, instances of the following class are required for the types SymValue and Byte:

class *Bits* $\alpha$
  where
    (.&.), (.|.), *xor*   :: $\alpha \to \alpha \to \alpha$
    *complement*   :: $\alpha \to \alpha$
    *shift*   :: $\alpha \to Int \to \alpha$
    *rotate*   :: $\alpha \to Int \to \alpha$
    *bit*   :: $Int \to \alpha$
    *setBit*   :: $\alpha \to Int \to \alpha$
    *clearBit*   :: $\alpha \to Int \to \alpha$
    *complementBit*   :: $\alpha \to Int \to \alpha$
    *testBit*   :: $\alpha \to Int \to Bool$
    *bitSize*   :: $\alpha \to Int$
    *isSigned*   :: $\alpha \to Bool$

```
data LCLProg = LCLProg
                    (Env Name EnvValue)
                    [Macro] [Rel]
                    deriving (Show, Eq)

data Rel = ROrg Value
        | RExit
        | RVarDef Name Value
        | RBinOp Bin Op
        | RUnaryOp UnaryOp
        | RSubst SName Index
        | RPushSymbol SName
        | RRAttrib Attribute
        | RFetch
        | RStore
        | RIf
        | RElse
        | REndIf
        | RByte Word32
        | RPatch Int Int
        | RAbortMacro
        | RReturn
        | RDCompare
          deriving (Show, Eq)

dataBinOp = BAdd | BSub | BMul
        | BDiv | BLT | BGT
        | BAnd | BOr | BRShift
        | BLShift | BBitAnd | BBitOr
          deriving (Show, Eq)

dataUnaryOp = UNot
              deriving(Show, Eq)

dataMacro = Macro
              Name
              (Env Name EnvValue)
              [Env Name EnvValue]
              [Rel]
              deriving (Show, Eq)
```

Figure 1: LCL grammar

As these two types represent elements of target machine addresses—SymValue and Byte are representive of a target machine word and eight bits of a word, respectively—then the signedness of these types is determined by the choice of the target address space.

```
int foo;
int label;
main
{
                MOVI #0, R2;
label :
                MOVI #10, R2;
                MOVI #label + 10, R3;
}
```

LCLProg (Env [("__TPC", (0, [(AttribWritten, 1)])),
("__CHANGED", (1,[])),
("__PASS", (1, [])),
("__FAIL", (0, [])),
("foo", (0, [])),
("label", (0, []))]) []
[RPushValue 2,
RPushValue 0,
RByte 204,
RByte 0,
RByte 0,
RByte 0,
RPatch 16 10,
RPatch 6 4,
RPushSymbol "__TPC",
RFetch,
RPushSymbol "label",
RStore,
RPushValue 2,
RPushValue 10,
RByte 204,
RByte 0,
RByte 0,
RByte 0,
RPatch 16 10,
RPatch 6 4,
RPushValue 3,
RPushSymbol "label",
RFetch,
RPushValue 10,
RBinOp BAdd,
RByte 204,
RByte 0,
RByte 0,
RByte 0,
RPatch 16 10,
RPatch 6 4,]
```

4. A DYNAMIC SEMANTICS FOR LCL

*evalLCLProg* : *LCLProg* → [*Section*]*evalLCLProg* (*LCLProg env macros relos* ) =
　　　　　　　　　　　　　　　　　　*f macros env emptyEnv emptyStack* 0 [(0, [])] [(0, [])]
　where
　　　*f macros env lenv stack sv sections lsections* =
　　　　case *evalLCLProg' macros relos env lenv stack sv sections lsections* of
　　　　　*LCLExit s* → *s*
　　　　　*LCLContinue macros env lenv stack sv sections* → *f macros (upEnv env) lenv stack* 0 [(0, [])] *sections*
　　　*upEnv env* = *updateEnv env* " _ _*PASS*" (*fst* (*lookupEnv env* " _ _*PASS*") + 1, [])
*evalLCLProg'* : [*Macro*] → [*Rel*] → *Env Name EnvValue* → *Env Name EnvValue* →
　　　　　　　　　　*Stack StackValue* → *SymValue* → [*Section*] → [*Section*] → [*Section*]
*evalLCLProg'* _ [] *env* _ _ _ *sections* _ = *sections*
*evalLCLProg'* _ (*RExit* : *relos*) _ _ _ _ *sections* _ = *sections*
*evalLCLProg' macros* (*RV ar Def name value* : *relos*) *env lenv stack sv sections lsections* =
　　　　　　　　　　*evalLCLProg' macros relos env* (*addEnv lenv name* (*value*, [])) *stack sv sections lsections*
*evalLCLProg' macros* (*ROrg tpc* : *relos*) *env lenv stack sv sections lsections* =
　　　　　　　　　　*evalLCLProg' macros relos env' lenv stack tpc sections' lsections*
　where
　　　*env'*　　　　　　　　　　　　　　　　　= *updateEnv env* " _ _*TPC*" (*tpc*, [])
　　　*sections'* | *null* (*dropWhile* (λ(*x,y*) → *x*/ = *sv*) *sections*) = = *True* = *sections*
　　　　　　　 | *otherwise*　　　　　　　　　　　　　　　　　= (*tpc*, []) : *sections*
*evalLCLProg' macros* (*RFetch* : *relos*) *env lenv stack sv sections lsections* =
　　　　　　　　　　*evalLCLProg' macros relos env'' lenv'* (*push* (*SValue v*) (*pop stack*)) *sv sections lsections*
　where
　　　*passNo*　　　　　 = *fst* (*lookupEnv env* " _ _*PASS*")
　　　*tpc*　　　　　　　 = *fst* (*lookupEnv env* " _ _*TPC*")
　　　(*SSym symbol*)　　 = *tos stack*
　　　(*v, attribs*)　　　 = *lookupEnvStack* [*lenv, env*] *symbol*
　　　[*lenv', env'*]　　　 = *updateEnvStack* [*lenv, env*] *symbol* (*v, uattribs*)
　　　*uattribs*　　　　　 = *updateAttribute AttribRead passNo attribs*
　　　*updateFail env*　　= let
　　　　　　　　　　　　　(*fv, att*) = *lookupEnv env* " _ _*FAIL*"
　　　　　　　　　　　in
　　　　　　　　　　　if *fv* = = 1 then
　　　　　　　　　　　　　*env*
　　　　　　　　　　　else
　　　　　　　　　　　　　else *updateEnv env* " _ _*FAIL*" (1, *att*)
　　　*env''*　　　　　　 = if *isInternalSym symbol* then
　　　　　　　　　　　　　*env'*
　　　　　　　　　　　else
　　　　　　　　　　　　　case *readAttribute AttribWritten attribs* of
　　　　　　　　　　　　　　*Nothing* → *updateFail env'*
　　　　　　　　　　　　　　*Just pass* → if (*v* < *tpc* && *passNo* < *pass*)||
　　　　　　　　　　　　　　　　　　　　　 (*v* >= *tpc* && *pass* / = *passNo* + 1 ) then
　　　　　　　　　　　　　　　　　　　 *updateFail env'*
　　　　　　　　　　　　　　　　　　else
　　　　　　　　　　　　　　　　　　　 *env'*
*evalLCLProg' macros* (*RStore* : *relos*) *env lenv stack sv sections lsections* =
　　　　　　　　　　*evalLCLProg' macros relos env' lenv'* ((*pop.pop*) *stack*) *sv sections lsections*
　where
　　　(*passNo, _*)　　 = *lookupEnv env* " _ _*PASS*"
　　　(_, *attribs*)　　　 = *lookupEnvStack* [*lenv, env*] *symbol*
　　　*uattribs*　　　　 = *updateAttribute AttribWritten passNo attribs*
　　　[*lenv', env'*]　　 = *updateEnvStack* [*lenv, env*] *symbol* (*v, uattribs*)
　　　(*SSym symbol*)　 = *tos stack*
　　　(*SValue v*)　　　 = *tos* (*pop stack*)

Figure 2: LCL semantics in Haskell 98 – Part 1

```
evalLCLProg' ms (RRAttrib attrib : relos) env lenv stacks sv secs lsecs =
        let
            ls          = dropWhile (λ(x, _) → attrib/ = x) attribs
            (SSym symbol) = tos stack
            attribs     = snd (lookupEnvStack [lenv, env] symbol)
        in
        if null ls then
            error(symbol ++ "does not have attribute" ++ show attrib)
        else
            evalLCLProg' ms relos env lenv (push (SValue (snd (head ls))) (pop stack)) sv secs lsecs
evalLCLProg' macros (RPushSymbol symbol : relos) env lenv stack sv sections lsections =
            evalLCLProg' macros relos env lenv (push (SSym symbol) stack) sv sections lsections
evalLCLProg' macros (RPushValue value : relos) env lenv stack sv sections lsections =
            evalLCLProg' macros relos env lenv (push (SValue value) stack) sv sections lsections
evalLCLProg' macros (RDCompare : relos) env lenv stack sv sections lsections =
            evalLCLProg' macros relos env lenv
                        (push (SBoolean (eqSections sections lsections) stack))
                        sv sections lsections
evalLCLProg' macros (RUnaryOp uop : relos) env lenv stack sv sections lsections =
            evalLCLProg' macros relos env lenv (evalUOp uop stack) sv sections lsections
evalLCLProg' macros (RBinOp bop : relos) env lenv stack sv sections lsections =
            evalLCLProg' macros relos env lenv (evalBOp bop stack) sv sections lsections
evalLCLProg' macros (RByte byte : relos) env lenv stack sv sections lsections =
            evalLCLProg' macros relos env' lenv stack sv sections' lsections
    where
        (env', sections') = insertByte env sv sections byte
evalLCLProg' macros (RPatch nbits nstart : relos) env lenv stack sv sections lsections =
            evalLCLProg' macros relos env lenv (pop stack) sv sections' lsections
    where
        sections' = patchBytes env stack sv sections nbits nstart
evalLCLProg' macros (RSubst name index : relos) env lenv stack sv sections lsections =
        let
            result = evalMacro macros (lookupMacroRels macros name)
                        env (lookupMacroEnv macros name)
                        (lookupMacroUEnv macros name index)
                        (buildEnv [] ) 0 stack
        in
        error "yet to handle RSubst in evalLCLProg"
evalLCLProg' macros (RIf : relos) env lenv stack sv sections lsections =
        if tos stack = = (SValue 1) then
            evalLCLProg' macros (trelos ++ arelos) env lenv (pop stack) sv sections lsections
        else
            evalLCLProg' macros (frelos ++ arelos) env lenv (pop stack) sv sections lsections
    where
        (frelos, arelos) = let
                eEIFRelos = dropWhile (λx → x/ = REndIf&&x/ = RElse)relos
                eEIF      = head eEIFRelos
                fRelos    = takeWhile (λx → x/ = REndIf) (tail eEIFRelos)
                aRelos    = tail (dropWhile (λx → x/ = REndIf) (tail eEIFRelos))
            in
            if eEIF = = REndIf then
                ([], tail eEIFRelos)
            else
                (fRelos, aRelos)
        trelos    = takeWhile (λx → x/ = REndIf && x/ = RElse) relos
```

```
evalLCLProg' macros (REndIf : relos) env lenv stack sv sections lsections = error "no matching RIf for REndIf"
evalLCLProg' macros (RElse  : relos) env lenv stack sv sections lsections = error "no matching RIf for RElse"
evalLCLProg' _ (rel : relos) _ _ _ _ _ = error (show rel)
evalBOp bop stack = let
                        (SValue l) = tos stack
                        (SValue r) = tos (pop stack)
                    in
                    case bop of
                        BAdd → push (SValue (l + r)) ((pop.pop) stack)
                        BSub → push (SValue (l − r)) ((pop.pop) stack)
                        BLT  → push (SBoolean (l < r)) ((pop.pop) stack)
                        BGT  → push (SBoolean (l > r)) ((pop.pop) stack)
```

Figure 3:
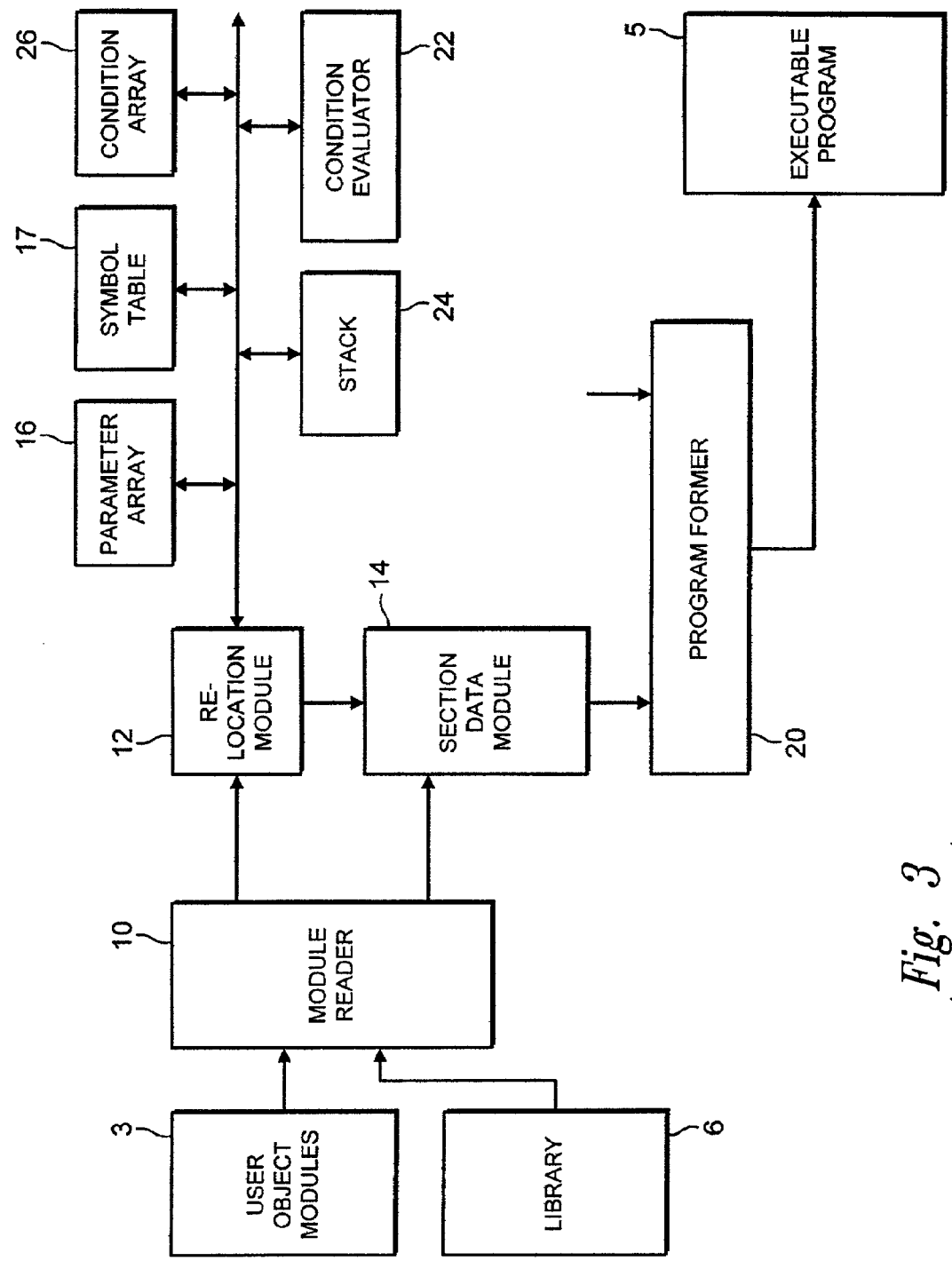
FIG. 3 is a block diagram of a linker according to the prior art.

Figure 3: LCL semantics in Haskell 98 – Part 2

```
patchBytes : Env Name EnvValue → Stack StackValue → SymValue → [Section] → Int → Int → [Section]
patchBytes env stack sv sections nbits nstart =
        let
            tpc       = word32ToInt (fst (lokkupEnv env "__TPC") - sv)
            bytes     = getSection
            msu_byte  = head (drop (tps - 4) bytes)
            lsu_byte  = head (drop (tps - 3) bytes)
            msl_byte  = head (drop (tps - 2) bytes)
            lsl_byte  = head (drop (tps - 1) bytes)
            inst      = (shiftL msu_byte 24) .|. (shiftL lsu_byte 16) .|. (shiftL msl_byte 8) .|. lsl_byte
            u_bits    = shiftL (shiftR inst (nbits + (nstart - 1)))(nbits + (nstart - 1))
            up_bits   = shiftL (shiftR inst nstart) nstart
            l_bits    = inst - up_bits
            pinst     = inst .|. shiftL v nstart
            pmsu_byte = shiftR (pinst .&. (0xFF000000 : Word32)) 24
            plsu_byte = shiftR (pinst .&. (0x00FF0000 : Word32)) 16
            pmsl_byte = shiftR (pinst .&. (0x0000FF00 : Word32)) 8
            plsl_byte = pinst .&. (0x000000FF : Word32)
            tpc       = word32ToInt (fst (lookupEnv env "__TPC") - sv)
            bytes     = getSection
            msu_byte  = head (drop (tpc - 4) bytes)
        in
        updateSection (updateByte (tpc - 4) (updateByte (tpc - 3)
                        (updateByte (tpc -2) (updateByte (tpc -1) bytes plsl_byte) pmsl_byte)
                        plsu_byte) pmsu_byte) sv sections
where
    (SValuev) = tos stack insertByte : Env Name EnvValue → SymValue → [Section] → Byte → (Env Name EnvValue [Section])
insertByte env sv sections byte =
        let
            bytes            = getSection
            (tpc', tpc_attrib) = lookupEnv env "__TPC"
            tpc              = tpc' - sv
            i_tpc            = word32ToInt tpc
            env'             = incrementTPC tpc tpc_attrib
        in
        (env', if length bytes < i_tpc + then
                    updateSection (bytes++[byte])
               else
                    updateSection (updateByte tpc bytes))
where
    (passNo, _)           = lookupEnv env "__PASS"
    incrementTPC tpc attribs = updateEnv env "__TPC" (tpc + 1, updateAttribute AttribWritten passNo attribs)

updateByte0 (_ : xs)byte = byte : xs
updateByten(x : xs) byte = x : updateByte (n - 1) xs byte
updateByte_[]       byte = error "cannot update byte that does not exist in section"

updateSection bytes sv sections = takeWhile (λ(x, y) → x/ = sv) sections ++ [(sv, bytes)] ++
                                    tail (dropWhile (λ(x, y) → x/ = sv) sections)

getSection = (snd.head) (dropWhile (λ(x, y) → x/ = sv) sections)
```

Figure 4: LCL semantics in Haskell 98 – Part 3

What is claimed is:

1. A linking method for forming an executable program from a plurality of object code modules, each object code module comprising section data and an ordered sequence of relaxation instructions including a first type defining relocation operations and a second type controlling linker operations, each relaxation instruction having associated therewith a unique instruction count of a sequence of instruction counts determining the ordered sequence of relaxation instructions, wherein the second type includes a jump relaxation instruction which specifies the instruction count of a relaxation instruction to be subsequently read, the linking method comprising:

(a) reading each relaxation instruction in the ordered sequence defined by the sequence of instruction counts; and (b) where said relaxation instruction is of the first type defining a relocation operation, executing that relocation operation on section data to which it relates, and where said relaxation instruction is a jump relaxation instruction, a next relaxation instruction which is read is that of the instruction count specified in the jump relaxation instruction, wherein the formed executable program comprises section data from the plurality of object code modules, relocated in accordance with the executed relaxation instructions.

2. A method according to claim 1, further comprising recording a pass value indicative of a number of times said ordered sequence of relaxation instructions has been repeated.

3. A method according to claim 2, further comprising detecting when a result of a relocation operation executed on said section data has changed between repetitions of said ordered sequence of relaxation instructions and recording a change value indicative of an occurrence of said change.

4. A method according to claim 1 wherein said first type of relaxation instruction specifies an offset and number of bytes of section data to be copied to said executable program.

5. A method according to claim 1 wherein said first type of relaxation instruction specifies a byte of section data to be copied to said executable program.

6. A method according to claim 1 wherein said relaxation instruction of the second type includes a conditional relaxation instruction which specifies a number of subsequent relaxation instructions to be skipped in response to a condition being met.

7. A method according to claim 6 wherein said executing comprises accessing a stack.

8. A method according to claim 7 wherein said condition is determined according to a value of a top of said stack.

9. A method according to claim 1 wherein said relocation instruction to be executed specifies a number of subsequent relaxation instructions which are to be repeatedly subsequently read until a condition is met.

10. A computer-readable medium having a computer program stored thereon to provide a linker for preparing an executable program from a plurality of object code modules, each object code module comprising section data and an ordered sequence of relaxation instructions including a first type defining relocation operations and a second type controlling linker operations, each relaxation instruction having associated therewith a unique instruction count of a sequence of instruction counts determining the ordered sequence of relaxation instructions, the linker comprising:

a relaxation module for reading the relaxation instructions in an ordered sequence defined by the sequence of instruction counts, and for executing said relaxation instruction; and a section data module for holding section data and outputting the prepared executable program;

wherein, when said relaxation instruction defines a relocation operation, the relaxation module executes said relocation operation on section data defined in one or more previous relaxation instructions and, when said relaxation instruction identifies section data, said section data is copied to said section data module, said section data being relocatable by subsequent previous relocation operations.

11. A computer-readable medium according to claim 10 wherein said linker comprises, a state flag means for holding a pass value indicative of a number of times the ordered sequence of said relaxation instructions has been repeated.

12. A computer-readable medium according to claim 11 wherein said linker comprises state flag means for recording a change value to indicate that copied section data has changed between repetitions of execution of a same relaxation instruction of the first type.

13. A computer-readable medium according to claim 10 wherein the relaxation module comprises means for deriving an offset and a number of bytes of section data to be copied to said executable program from said second type of relaxation instruction.

14. A computer-readable medium according to claim 10 wherein the relaxation module comprises means for defining a byte of section data to be copied to said executable program.

15. A computer-readable medium according to claim 10 wherein the linker comprises a stack capable of holding values generated by execution of the relaxation instructions.

16. A computer-readable medium according to claim 15 wherein a value of a top of the stack is readable by the relaxation module to determine a condition.

17. A computer-readable medium according to claim 10, wherein said linker comprises a, means for determining whether a condition specified in a relaxation instruction of a third type is met, to determine a number of subsequent relaxation instructions to be skipped.

18. A computer program product for forming an executable program from a plurality of object code modules, said computer program product comprising program code means having section data and an ordered sequence of relaxation instructions including a first type defining relocation operations and a second type controlling linker operations, each relaxation instruction having associated therewith a unique instruction count of a sequence of instruction counts determining the ordered sequence of relaxation instruction, said program code means being arranged so that, when run on a computer, the following are performed:

(a) reading each relaxation instruction in the ordered sequence defined by the sequence of instruction counts; and (b) where said relaxation instruction is of the first type defining a relocation operation, executing that relocation operation on section data to which it relates, and where said relaxation instruction is a jump relaxation instruction, a next relaxation instruction which is read is that of the instruction count specified in the jump relaxation instruction;

wherein the formed executable program comprises section data from the plurality of object code modules, relocated in accordance with the executed relaxation instructions.

19. A linking method for forming an executable program from a plurality of object code modules, each object code module comprising section data and an ordered sequence of relaxation instructions including a first type defining relocation operations and a second type controlling linker operations wherein the second type includes a conditional relaxation instruction which determines whether subsequent relaxation instructions are executed depending on a condition defined in the condition relaxation instruction, the linking method comprising:
  (a) reading each relaxation instruction of the ordered sequence; and
  (b) where said relaxation instruction is of the first type defining a relocation operation, executing that relocation operation on section data to which it relates, and
  where said relaxation instruction is a jump relaxation instruction, a next relaxation instruction which is read is that of an instruction count specified in the jump relaxation instruction,
  and where the relaxation instruction is a conditional relaxation instruction, accessing a state variable which denotes linker state to determine whether the condition is satisfied;
  wherein the formed executable program comprises section data from the plurality of object code modules, relocated in accordance with the executed relaxation instructions.

20. A method according to claim 19 wherein the state variable is a pass value indicative of a number of times said ordered sequence of said relaxation instructions have been repeated.

21. A method according to claim 19 wherein the state variable is a change flag denoting whether a symbol has changed value during repeated executions of the ordered sequence of relaxation instructions.

22. A method of forming an executable program from a plurality of object code modules, each object code module comprising an ordered sequence of relaxation instructions including a first type defining section data, a second type defining relocation operations and a third type controlling linker operations, each relaxation instruction having associated therewith a unique instruction count of a sequence of instruction counts determining the ordered sequence of relaxation instructions, the method comprising:
  reading each relaxation instruction in the ordered sequence defined by the sequence of instruction counts;
  where said relaxation instruction defines a relocation operation, executing said relocation operation on section data defined in one or more previously read relaxation instructions; and
  where said relaxation instruction defines section data, copying said section data to said executable program, said section data being relocatable by subsequent previous relocation operations.

* * * * *